United States Patent

Wickam

[11] 3,987,888
[45] Oct. 26, 1976

[54] SORTING SWITCH
[75] Inventor: Irwin Edward Wickam, Garland, Tex.
[73] Assignee: Stewart Engineering and Equipment Co., Richardson, Tex.
[22] Filed: Feb. 2, 1976
[21] Appl. No.: 654,655

Related U.S. Application Data
[63] Continuation of Ser. No. 506,524, Sept. 16, 1974, abandoned.

[52] U.S. Cl. .............................. 198/802; 108/143; 246/415 R; 248/429; 198/440; 198/437
[51] Int. Cl.² ................ B65G 47/26; A47B 11/00; E01B 7/00; F16M 13/00
[58] Field of Search .......... 198/31 R, 31 AA, 31 AB, 198/31 AC, 32, 38, 40; 214/11 R, 11 A, 11 C, 750; 104/105, 130; 308/3 R, 3 CH, 3.6, 3.8, 3.9; 246/415 R; 248/429; 108/65, 143

[56] References Cited
UNITED STATES PATENTS

| | | | |
|---|---|---|---|
| 2,707,659 | 5/1955 | Sloyan | 308/3 R |
| 3,129,803 | 4/1964 | Giulie et al. | 198/31 AC |
| 3,511,357 | 5/1970 | Vanderhoof | 198/31 AB |
| 3,770,100 | 11/1973 | McCaul | 198/38 |
| 3,815,510 | 6/1974 | Tourtellier | 104/130 |

*Primary Examiner*—Evon C. Blunk
*Assistant Examiner*—Joseph E. Valenza
*Attorney, Agent, or Firm*—Richards, Harris and Medlock

[57] ABSTRACT

A sorting switch comprises a plurality of channel-shaped pallet support members mounted on drive chains for movement around a course including an upper article sorting portion and a lower return portion. The upper article sorting portion of the course includes parallel article conveying paths, and the pallet support members extend across both article conveying paths. A pallet is slidably supported on each pallet support member and has a switch engaging member depending therefrom. The pallets are arranged in sets, with alternate sets of pallets being normally aligned with opposite article conveying paths. Switching mechanisms are provided for selectively allowing each set of pallets to remain aligned with the article conveying path normal thereto or for diverting the pallets comprising the sets into alignment with the opposite article conveying path. Each switching mechanism includes a stationary input channel for receiving the switch engaging members of the pallets normally aligned with a particular path, a switching channel supported for pivotal movement to receive the switch engaging members from the input channel and to selectively direct the switch engaging members and the pallets connected thereto either to the normal article conveying path or to the opposite article conveying path, and camming structure for receiving the switch engaging members from the switching channel and for either directing the channel members and the pallets connected thereto along the normal article conveying path or for diverting the switch engaging members and the pallets connected thereto into alignment with the opposite article conveying path. Camming structure is also provided on the return portion of the course for returning all of the pallets to their normal orientation with respect to the course.

49 Claims, 18 Drawing Figures

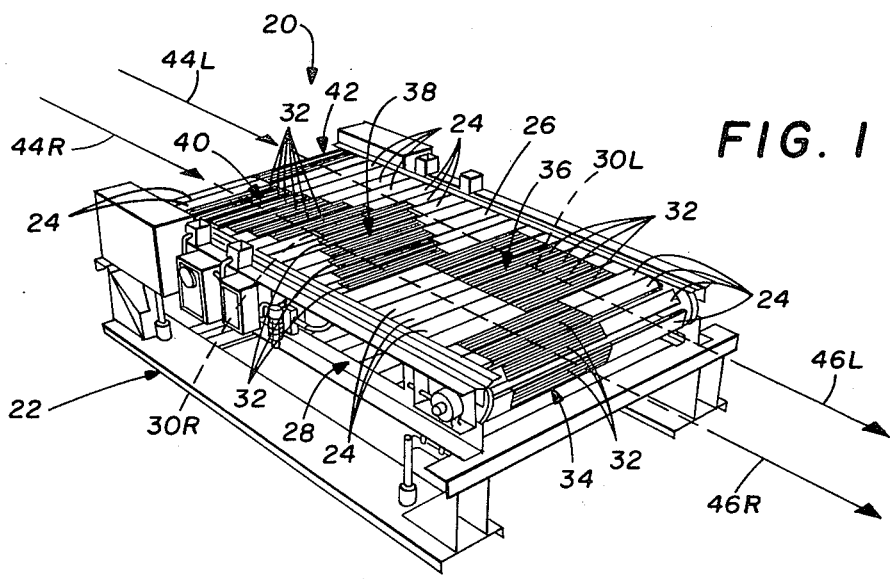
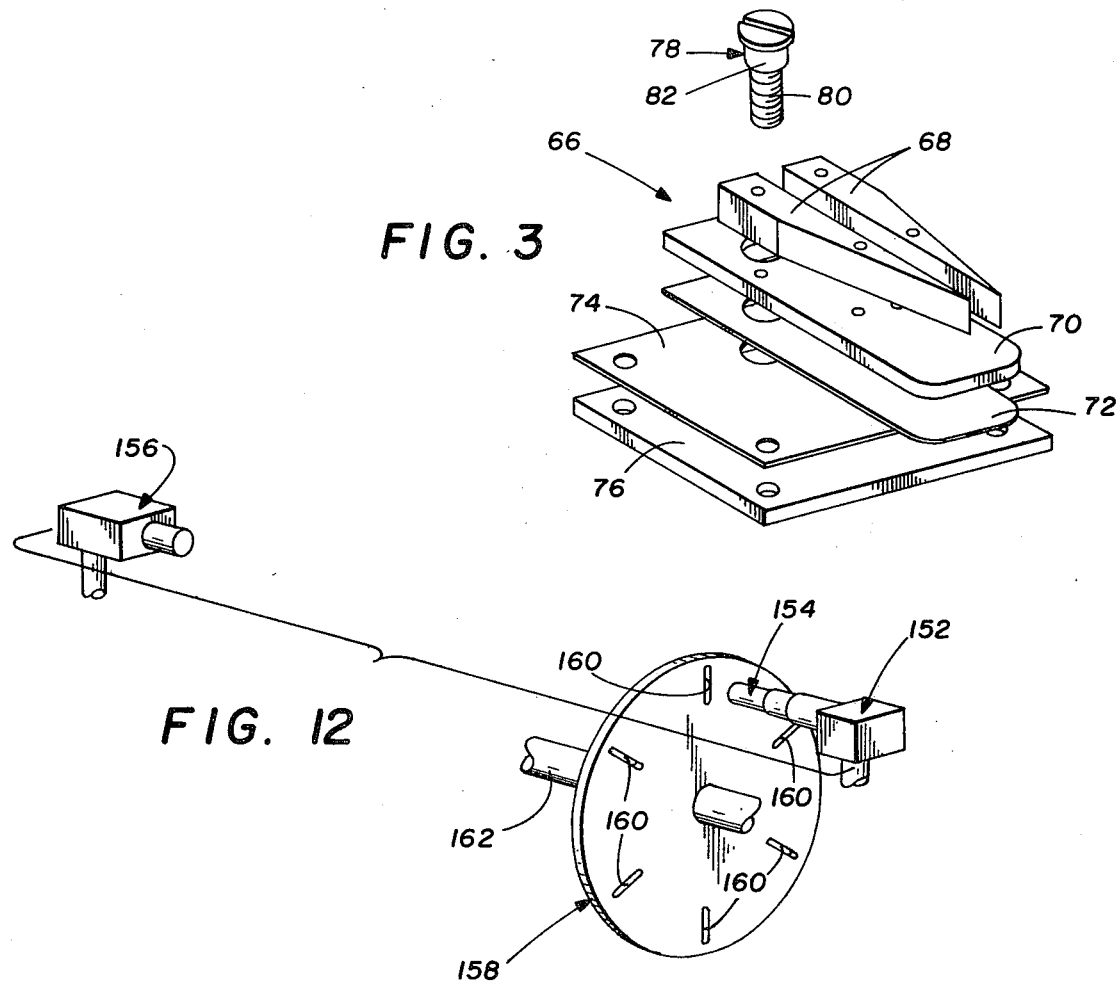

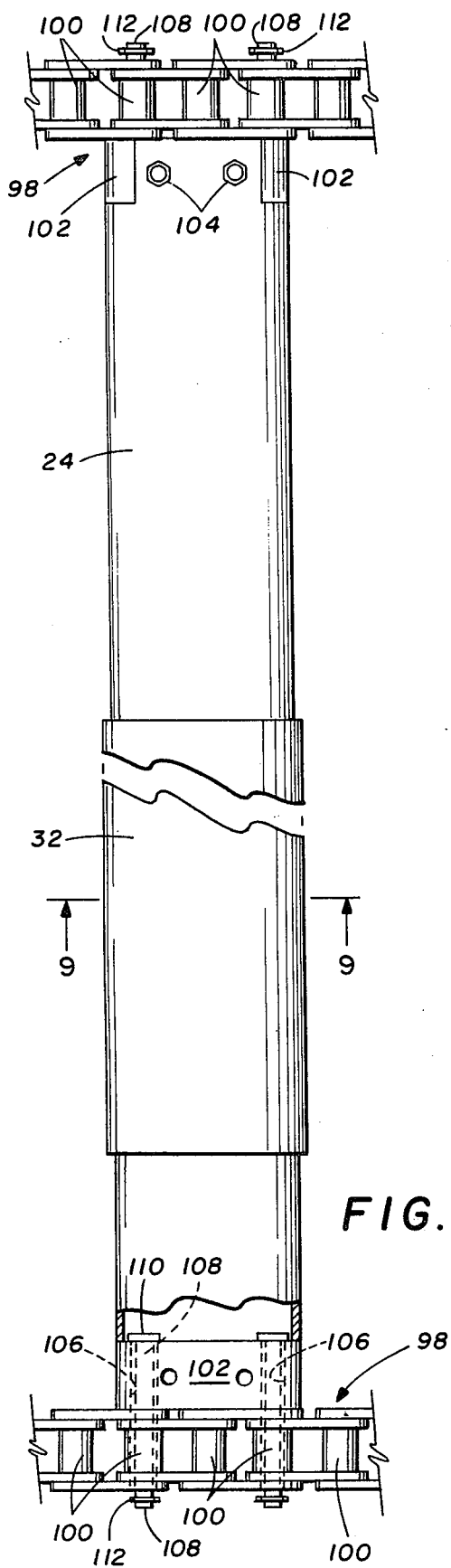
FIG. 7
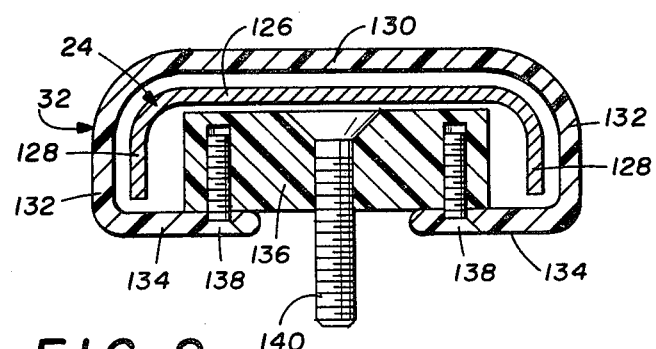
FIG. 9
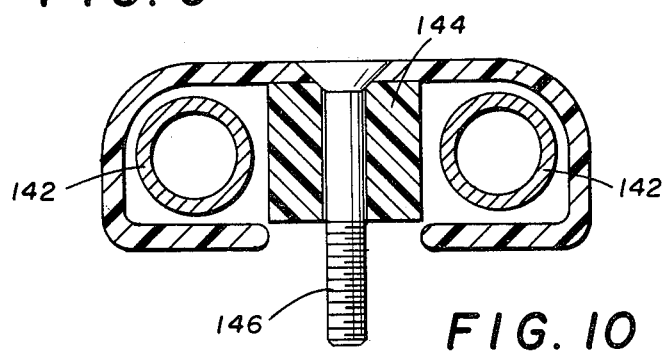
FIG. 10
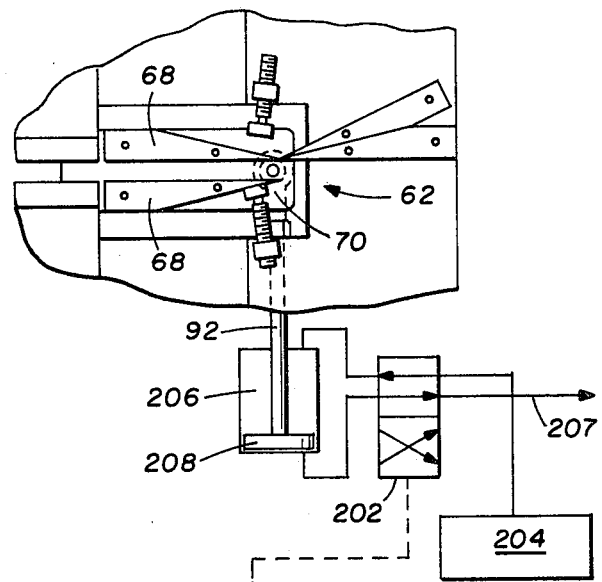
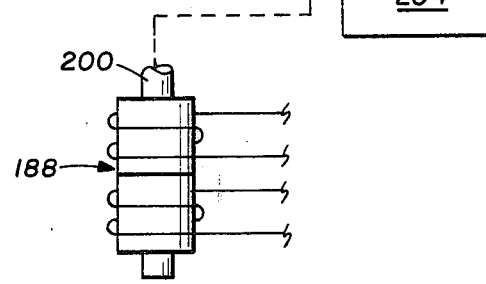
FIG. 14

SORTING SWITCH

This is a continuation of application Ser. No. 506,524, filed Sept. 16th, 1974, now abandoned.

CROSS REFERENCE TO RELATED APPLICATION

The disclosure of this application is identical to that of copending application Ser. No. 654,653, filed by Dale R. Hamilton of even date herewith.

BACKGROUND AND SUMMARY OF THE INVENTION

This invention relates to a sorting switch, and more particularly to a horizontal switch for receiving articles from each of two input conveyors and for selectively directing the articles to either of two output conveyors.

In the art of article handling, various types of sorting switches have been provided heretofore. For example, switches have been provided for receiving articles from two or more input conveyors and for converging the articles, so that all of the articles are directed to a single output conveyor. Other switches have been designed to receive articles from a single input conveyor and to diverge the articles so that the articles are selectively directed to one of two or more output conveyors. Still other sorting switches have operated to receive articles from a pair of input conveyors and to direct articles to a pair of corresponding output conveyors while selectively combining certain articles by directing them to a third output conveyor. However, notwithstanding these and other types of sorting switches well known in the art, there has not heretofore been provided a sorting switch capable of receiving articles from two input conveyors and selectively directing the articles to either of two output conveyors.

The present invention comprises a novel sorting switch which fulfills the foregoing and other requirements long since associated with the prior art. In accordance with the broader aspects of the invention, a plurality of pallets are mounted for movement around a course including an upper sorting portion and a lower return portion. The upper sorting portion of the course defines a pair of parallel article conveying paths, and alternate pallets or sets thereof are normally aligned with opposite article sorting paths. Switching apparatus is provided for selectively either allowing a predetermined pallet or set thereof to follow its normal article sorting path or for diverting the pallet or set thereof into alignment with the opposite article sorting path. Structure is provided on the return portion of the course for returning all of the pallets to their normal orientation relative to the course.

In accordance with more specific aspects of the invention, the pallets are slidably supported on channel-shaped pallet support members each comprising a relatively wide, substantially flat upper web and flanges depending from each of the webs. The use of channel-shaped pallet support members is advantageous in substantially increasing the capacity of the sorting switch. Each pallet has a switch engaging member depending therefrom. The structure for returning the pallets to their normal orientation relative to the course comprises camming apparatus which engages the switch engaging members of the pallets during movement thereof along the return portion of the course.

The switching apparatus comprises a pair of switching mechanisms mounted on opposite sides of the upper article sorting portion of the course. Each switching mechanism includes a stationary input channel for receiving the switch engaging member of the pallet aligned with one of the article conveying paths. The input channel directs the switch engaging members to a switching channel which is mounted for pivotal movement between a position in which the switch engaging members and the pallets connected thereto are directed along the normal article conveying path and a position in which the switch engaging members and the pallets connected thereto are diverted to the opposite article conveying path. The input channel and the switching channel of each switching mechanism are so arranged that the adjacent ends thereof are aligned regardless of the positioning of the switching channel. Camming structure is provided for receiving the switch engaging members from the switching channel and for directing the switch engaging members and the pallets connected thereto either along the normal article conveying path or into alignment with the opposite article conveying path.

DESCRIPTION OF THE DRAWINGS

A more complete understanding of the invention may be had by reference to the following Detailed Description when taken in conjunction with the accompanying Drawings, wherein:

FIG. 1 is a perspective view of a sorting switch incorporating the invention;

FIG. 3 is an exploded view of a portion of the switching apparatus;

FIG. 7 is an illustration of the pallet support arrangement of the sorting switch of FIG. 1;

FIG. 9 is a sectional view taken generally along the line 9—9 of FIG. 7 in the direction indicated by the arrows;

FIG. 10 is a view similar to FIG. 9 showing the pallets of the sorting switch of FIG. 1 mounted on a different type of pallet support structure;

FIG. 12 is an illustration of a portion of the switching control apparatus of the sorting switch;

FIG. 14 is an illustration of the switch actuating apparatus of the sorting switch.

DETAILED DESCRIPTION

Figure 2:
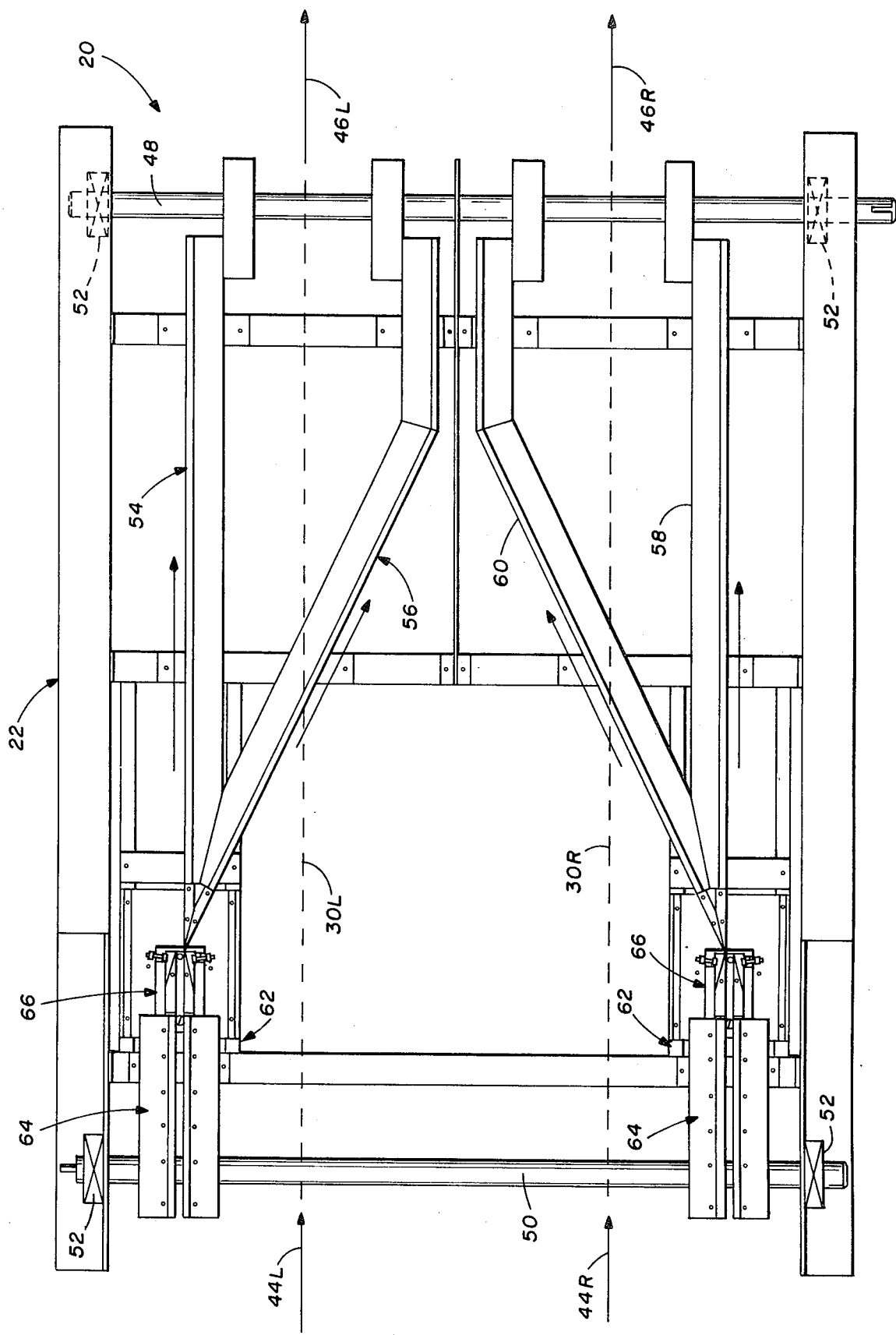
FIG. 2 is a top view of the frame and the switching apparatus of the sorting switch of FIG. 1.

Referring now to the Drawings, and particularly to FIG. 1 thereof, there is shown a sorting switch 20 incorporating the present invention. The sorting switch 20 includes a frame 22 which may be of any desired configuration. Preferably, however, the frame 22 is formed from steel and is designed to impart substantial structural rigidity to the sorting switch 20. The frame 22 is adapted for support either on a suitable floor, or from above.

A plurality of pallet support members 24 are mounted on the frame 22 for movement around a closed course including an upper article sorting portion 26 and a lower return portion 28. The upper article sorting portion 26 of the course is divided into spaced, parallel article conveying paths 30L and 30R. Each of the pallet support members 24 extends across both of the article conveying paths 30L and 30R.

The sorting switch 20 further comprises a plurality of pallets 32 each slidably supported on one of the pallet support members 24. The pallets 32 are arranged in sets, with each set of pallets comprising from one to as many pallets as may be required for a particular application. For example, sets of pallets 34, 36, 38, 40, and 42 each comprising five pallets are illustrated in FIG. 1.

The sets of pallets of the sorting switch 20 are normally alternately arranged with respect to the article conveying paths 30L and 30R. For example, the set of pallets 38 is normally aligned with the article conveying path 30L, the set of pallets 40 is normally aligned with the article conveying path 30R, and the set of pallets 42 is normally aligned with the article conveying path 30L. In the operation of the sorting switch 20, each set of pallets is either allowed to remain aligned with its normal article conveying path 30L or 30R, or is selectively diverted into alignment with the opposite article conveying path, in this case 30R or 30L. For example, the sets of pallets 34 and 36 are normally aligned with the article conveying paths 30L and 30R, respectively, but are illustrated in FIG. 1 in their fully diverted positions. The set of pallets 38 is normally aligned with the article conveying path 30L, but is illustrated in the process of being diverted into alignment with the article conveying path 30R. The set of pallets 40 is normally aligned with the article conveying path 30R, but is illustrated in FIG. 1 in the initial portion of the divert procedure, whereby it will alternately come into alignment with the article conveying path 30L.

In the use of the sorting switch 20, articles are received from a pair of input conveyors illustrated in FIG. 1 by the arrows 44L and 44R and are selectively delivered to a pair of output conveyors illustrated in FIG. 1 by the arrows 46L and 46R. Articles are alternately received from the input conveyors in accordance with the positioning of a set of pallets of the sorting switch 20 to receive the articles. Assuming that an article is received from the input conveyor represented by the arrow 44R, if the set of pallets which receives the article is allowed to remain in alignment with the conveying path 30R normal thereto, the article is delivered to the output conveyor represented by the arrow 46R. On the other hand, if the set of pallets which receives the article is diverted into alignment with the conveying path 30L, the article is delivered to the output conveyor represented by the arrow 46L. Conversely, articles received from the input conveyor represented by the arrow 44L are either delivered to the output conveyor represented by the arrow 46L or to the output conveyor represented by the arrow 46R, depending on whether the set of pallets remains aligned with the article conveying path normal thereto or is diverted into alignment with the opposite article conveying path. Those skilled in the art will appreciate the fact that the sorting switch 20 may also be used to receive articles from a single input path and to selectively deliver the articles to either of the two output paths. Another use of the sorting switch 20 is to receive articles from both of the input paths and to deliver all of the articles to a single output path.

In operation of the sorting switch 20, the pallets comprising a set thereof which is to be diverted out of alignment with its normal article conveying path into alignment with the opposite article conveying path are progressively moved across the width of the upper article sorting portion of the course of the pallet support member. For example, the sets of pallets 38 is shown in FIG. 1 at about the midpoint of this progressive movement. The progressive movement of the pallets comprising a particular set across the width of the sorting switch is advantageous in that the orientation of an article carried by the set of pallets is typically not disturbed during such progressive movement. Also, the progressive movement of the pallets is quite gentle in nature, so that the contents of the article being conveyed is not damaged in any way.

Referring now to FIG. 2, there is shown the portion of the frame 22 of the sorting switch 20 corresponding to the upper article sorting portion of the course of the pallet support members 24. The course of the pallet support members 24 is defined by a pair of axles 48 and 50 which are supported on the frame 22 by bearings 52 for rotation about spaced, parallel axes. The frame 22 includes a camming member 54 indicative of the path of travel of pallets which are initially aligned with the article conveying path 30L and which remain in alignment therewith as they traverse the upper article sorting portion 26 of the course of the pallet support members. A camming member 56 is indicative of the path of travel of pallets which are initially aligned with the article conveying path 30L but which are diverted into alignment with the article conveying path 30R. Similarly, a camming member 58 is indicative of the path of pallets which are initially aligned with the article conveying path 30R and which remain in alignment therewith, and a camming member 60 is indicative of the path of travel of pallets which are initially aligned with the article conveying course and which are diverted into alignment with the article conveying course 30L.

The sorting switch 20 further includes dual switch apparatus 62 mounted on opposite sides of the upper article sorting portion 26 of the course of the pallet support members 24. Each switch apparatus 62 includes a stationary input channel 64 which receives switch engaging members depending from the pallets 32. The input channels 64 direct the switch engaging members of the pallets to pivotally supported switching channels 66. The switching channels 66 are selectively positioned to direct the switch engaging members either into engagement with the camming member 54 or into engagement with the camming member 56, or either into engagement with the camming 58 or the camming member 60, depending on the positioning of the switch apparatus 62. By this means the pallets are selectively directed either along the article conveying path normal thereto or are diverted into alignment with the opposite article conveying path.

The switching channel 66 of the switch apparatus 62 is better illustrated in FIG. 3. A pair of diverter bars 68 are secured to a diverter plate 70 by means of suitable fasteners. The diverter bars 68 define a switch engaging member receiving channel therebetween. A layer of low friction material 72 is adhesively secured to the underside of the diverter plate 70. Another layer of low friction material 74 is secured to a support plate 76 by means of suitable fasteners. The diverter plate 70 and therefore the diverter bars 68 are rotatably secured to the support plate 76 by a diverter post 78. The diverter post 78 includes a lower threaded portion 80 which is received in the support plate 76 and an upper bearing portion 82 which is received in the diverter plate 70. It will thus be understood that the switching channel 66 defines a switch engaging member receiving channel which is supported for pivotal movement about an axis defined by the diverter post 78. Due to the use of the layers of low friction material 72 and 74, the frictional resistance to such pivotable movement is quite low.

Figure 4:
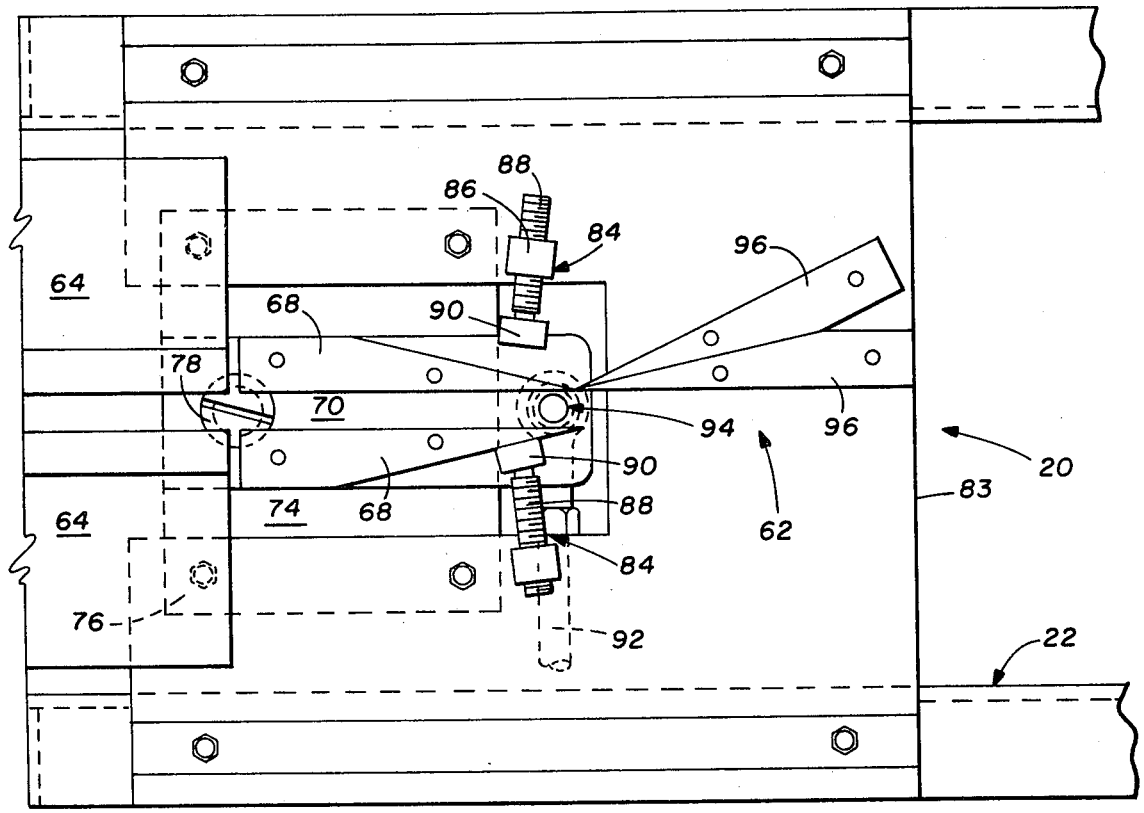
FIG. 4 is a further illustration of the switching apparatus of the sorting switch of FIG. 1.

The overall structure of the switching apparatus 62 of the sorting switch 20 is further illustrated in FIG. 4. The component parts of the switching apparatus are supported on a base plate 83 which is in turn secured to the frame 22. The axis of pivotable movement of the diverter plate 70 and the diverter bar 68 carried thereby as defined by the diverter post 78 is coincident with the entry end of the channel defined by the diverter bars 68. Therefore, the switching channel 66 is adapted to receive a switch engaging member depending from a pallet regardless of its pivotal positioning.

The limits of pivotal movement of the switching channels 66 are defined by a pair of stops 84. Each stop 84 includes a base 86 which is secured to the base plate 83, a threaded rod 88 which threadedly engages the base 86, and a diverter bar engaging stop 90 which is supported on the distal end of the threaded rod 88. The positioning of the stop 90 and therefore the limits of pivotal movement of the switching channel 66 are determined by selectively rotating the threaded rod 88 of a particular stop 84 relative to the base 86 thereof.

Each switching channel 66 is selectively pivoted by means of a rod 92 which is pivotally secured to the diverter plate 70 at 94. The rod 92 in turn extends to a suitable actuating mechanism, such as a fluid-powered cylinder. Such actuating mechanism is selectively operated to effect pivoting of the switching channel 66, the limits of the pivoting movement being determined by the stops 84.

FIG. 4 further illustrates a pair of diverter bars 96 which are secured to the base plate 83. The stationary diverter bars 96 comprise the switch engaging member receiving portions of the camming member 58 and the camming member 60 (or the camming member 54 and the camming member 56, as the case may be). It will be noted that the stationary diverter bars 96 mounted on the base plate 83 and the diverter bars 68 mounted on the diverter plate 70 are identical in configuration, and are adapted to be manufactured from a length of bar stock by cutting the bar stock at an angle of approximately 12½°. This comprises an important feature of the invention in that it substantially reduces the costs involved in manufacturing the switching apparatus 62. Moreover, should a particular surface of one of the diverter bars in a particular switching apparatus 62 become worn, the positioning of the various diverter bars in the switching apparatus may be rearranged, so as to position the worn surface such that it will not come into contact with the switch engaging members of the pallets and to position a fresh surface for engagement thereby.

Those skilled in the art will appreciate the fact that the configuration of the switching apparatus 62 comprises an important feature of the present invention. Thus, not only is the switching apparatus economical to manufacture and use as compared with prior art pallet diverter switch configurations, but the switching apparatus 62 also exhibits superior performance characteristics with respect to those of prior art pallet diverter switches. Thus, in the operation of the switching apparatus 62, it is practically impossible for the switch engaging members of the pallets to come into contact with stationary structure. In the use of the switching apparatus 62, it has been found that the pivotal positioning of the diverter bars 68 may be changed at practically anytime, including the time period during which switch engaging members are passing therethrough. Of course, it is undesirable to change the pivotal positioning of the diverter bars 68 when a switch engaging member is aligned with or substantially aligned with the ends of the diverter bars 68 adjacent to the stationary diverter bars 96. However, the necessary timing is early realized, such that the overall relationship of the timing of the pivoting of the diverter bars 68 to the movement of switch engaging members therethrough is much less critical than is the case with prior art pallet diverter switch arrangements.

Figure 5:
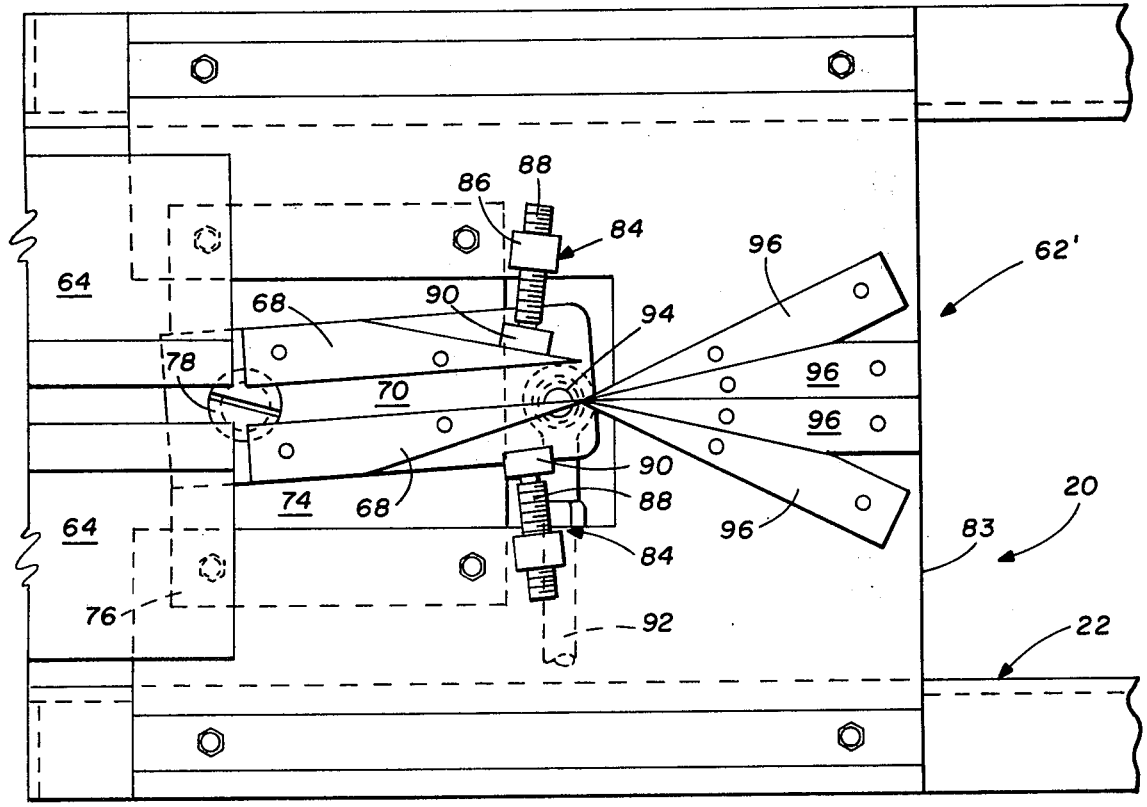
FIG. 5 is an illustration similar to FIG. 4 showing an alternative embodiment of the switching apparatus.

It will be understood that the switching mechanism 62 of FIG. 4 operates to selectively direct pallets either to a straight through path or to an angularly extending divert path. In FIG. 5 there is shown a switching mechanism 62' which is constructed identically to the switching mechanism 62 of FIG. 4, but which does not involve the use of a straight through path. Instead, the switching mechanism 62' functions to selectively direct switch engaging members and pallets connected thereto along either of two paths both of which extend angularly with respect to the input path of the switch engaging members. The switching mechanism 62' also differs from the switching mechanism 62 in that it utilizes four stationary diverter bars 96 all of which are secured to the base plate 83.

Figure 6:
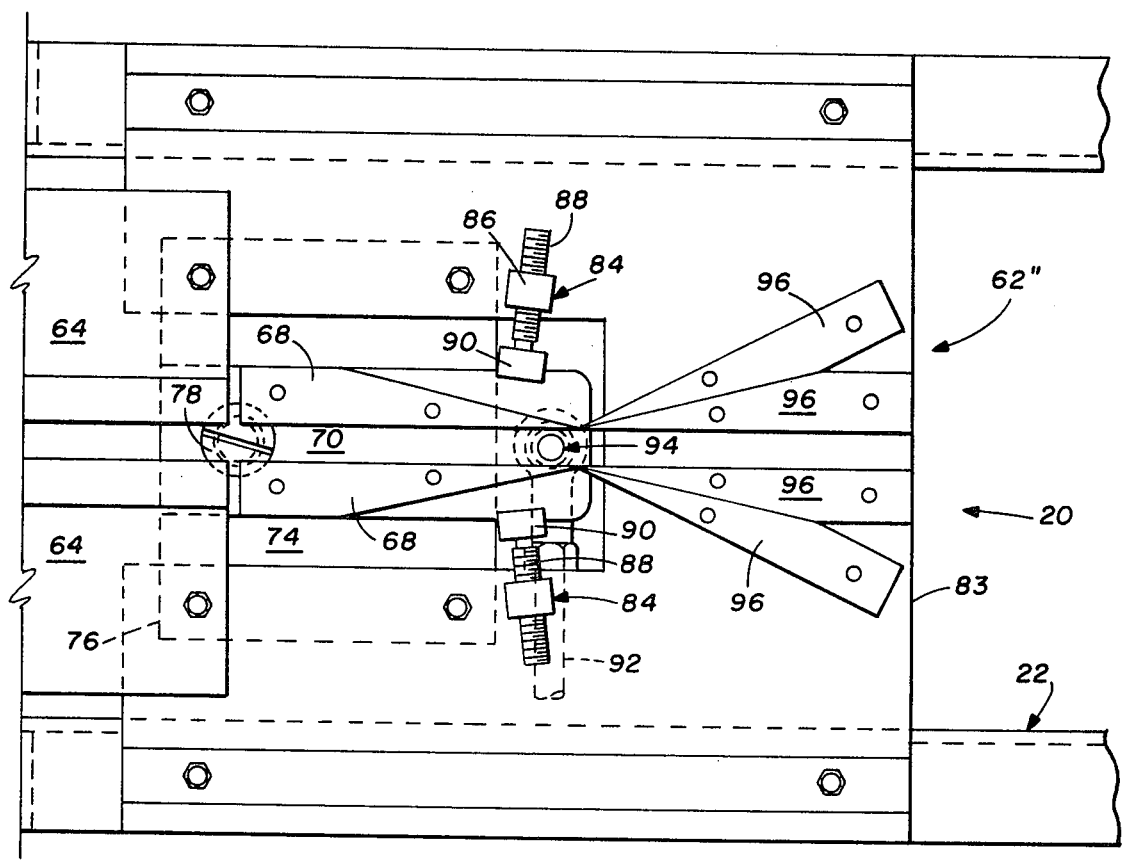
FIG. 6 is an illustration similar to FIG. 4 showing another alternative embodiment of the switching apparatus.

The switching mechanisms 62 and 62' of FIGS. 4 and 5 both comprise two-way switching mechanisms. In FIG. 6 there is shown a switching mechanism 62'' comprising a three-way switching mechanism. The switching mechanism 62'' is constructed substantially identically to the switching mechanism 62' of FIG. 5, except that it includes a third straight through path for the switch engaging members of the pallets in addition to the two angularly extending paths therefor.

Referring now to FIG. 7, the course of the pallet support members 24 of the sorting switch 20 is defined by a pair of drive chains 98 which comprise hollow pin roller chains and which are constrained around sprockets mounted on the axles 48 and 50. Each drive chain 98 comprises a series of interconnected links 100. Each pallet support member 24 has a pair of support blocks 102 secured in its opposite end by means of fasteners 104.

Each support block 102 has a pair of spaced, parallel apertures 106 formed therethrough. A pin 108 having a head 110 is received in each aperture 106 with the head 110 of the pin engaging a support block 102. The pins 108 of a particular support block 102 in turn extend through the hollow pins of adjacent links 100 of the drive chains 98. The end of each pin 108 remote from the head 110 receives a snap ring 112. By this means the opposite ends of each pallet support member 24 are secured to the drive chains 98 for movement thereby around the course.

Figure 8:
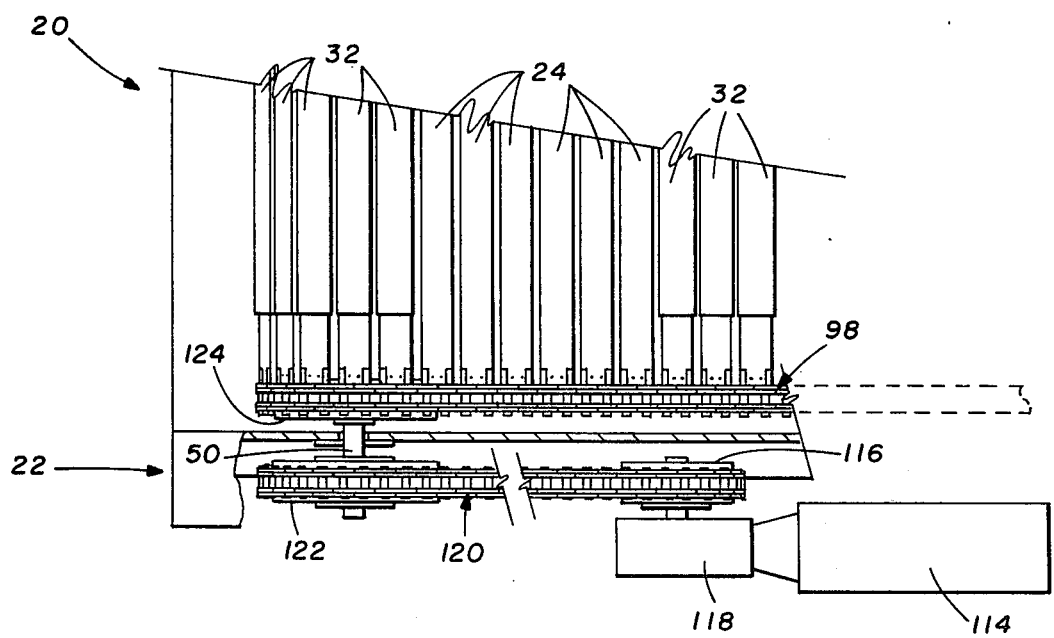
FIG. 8 is an illustration of the dirve mechanism of the sorting switch.

The drive mechanism for the sorting switch 20 is illustrated in FIG. 8. An electric motor 114 drives a sprocket 116 through a gear box 118. A drive chain 120 is constrained around the sprocket 116 and a slip clutch sprocket 122 mounted on the axle 50. The axle 50 also supports sprockets 124 which receive the drive chains 98. In this manner the motor 114 operates through the gear box 118, the sprocket 116, the slip clutch sprocket 122, the axle 50, and the sprockets 124 to drive the drive chains 98 and thereby move the pallet support members 24 around the course.

Referring to FIG. 9, a highly important feature of the present invention comprises the shape of the pallet support members 24. The pallet support members 24 are channel-shaped in cross-section, and each comprise an upper wall or web 126 and a pair of side wall or flanges 128 depending from the opposite edges of the web 126. It has been found that by means of the channel-shaped configuration of the pallet support members 24, the sorting switch 20 is adapted to carry a substantially greater weight per foot of pallet support member length than is the case when a sorting switch is provided with tubular pallet support members of the type known in the prior art.

Each pallet support member 24 supports a single pallet 32. The pallets 32 are preferably formed from a suitable plastic material having good wear resistance, and may advantageously comprise plastic extrusions. For example, the pallets 32 may comprise ultra high molecular weight polyethylene. Each pallet 32 comprise an upper wall or web 130 and a pair of side walls or flanges 132 depending from the opposite edges of the web 130. The flanges 132 in turn extend to a pair of lips 134 which turn inwardly and extend substantially parallel to the web 130. The pallet has an interior configuration that is substantially identical to the exterior surface configuration of the pallet support member.

The pallet 32 is secured in place on the pallet support member 24 by means of a block 136 formed from conventional bar stock. The block 136 may comprise a length of either conventional metal or conventional plastic bar stock in accordance with particular requirements. The pallet 32 is secured to the block 136 by means of threaded fasteners 138 extending through the lips 134 of the pallet 32 and into the block 136. A switch engaging member 140 is secured in the block 136 and extends downwardly therefrom for engagement with the switching mechanisms and the camming members of the sorting switch 20. The switch engaging member 140 may be secured in the block 136 by suitable means, such as by means of a suitable adhesive. Alternatively, the upper portion of the switch engaging member 140 may be adapted for threaded engagement with the block 136.

Referring to FIG. 10, it will be seen that the same pallet 32 which is employed in the present invention in conjunction with the pallet support members 24 is adapted for use in sorting switches employing conventional tubular pallet support members 142. In the latter instance the tubular pallet support members 142 are received in the portion of the pallet 32 extending between the web 130 and the lips 134 and adjacent to the flanges 132. A block of conventional bar stock 144 is mounted between the tubular pallet support members 142. The block 144 may comprise either conventional metal bar stock or conventional plastic bar stock in accordance with particular requirements. A switch engaging member 146 extends through the web 130 of the pallet 32 and through the block 144 and depends therefrom for engagement with the switching apparatus and the camming members of a sorting switch employing the pallet 32. The switch engaging member 146 has a threaded upper portion which is threadedly engaged with the block 144.

Figure 11:
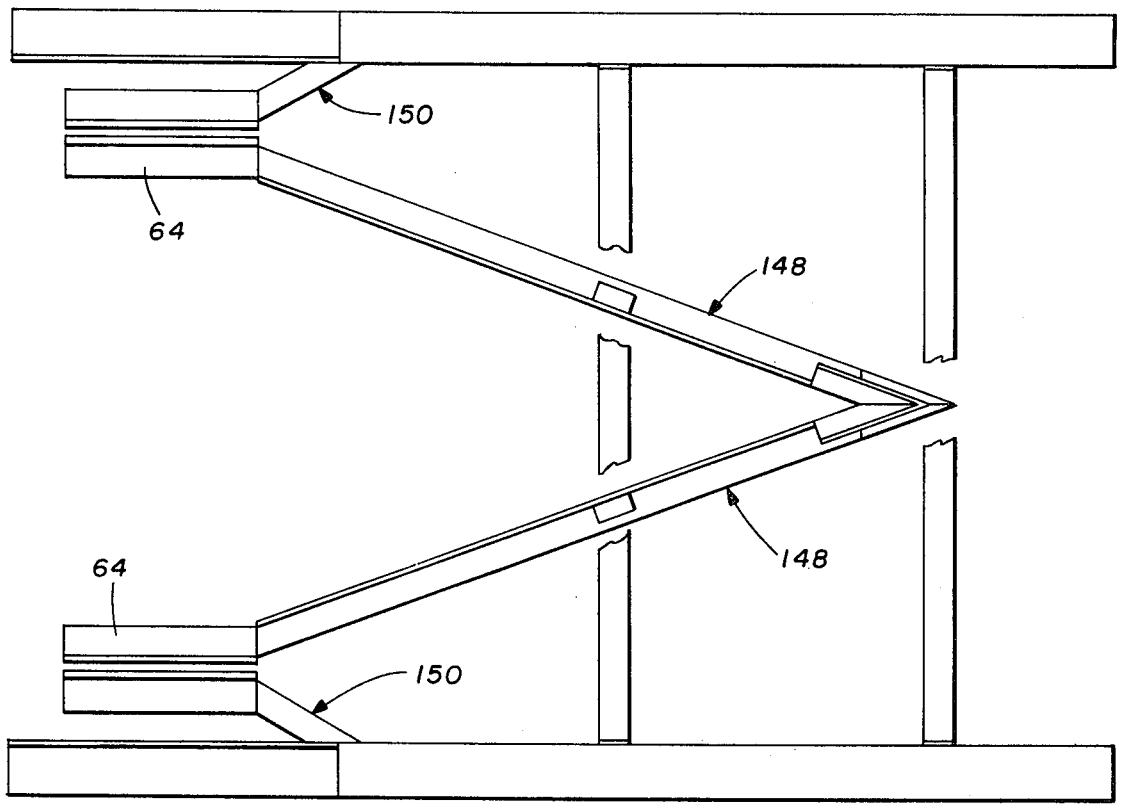
FIG. 11 is an illustration of the return portion of the frame of the sorting switch.

The portion of the frame 22 of the sorting switch 20 comprising the return portion 28 of the course of the pallet support members 24 is illustrated in FIG. 11. The switch engaging members of any pallets which have been diverted out of alignment with the article conveying path normal thereto and into alignment with the opposite article conveying path engage a camming structure 148. The function of the camming structure 148 is to return each pallet to its normal orientation with respect to the course of the pallet support members 24, whereby the switch engaging members of the pallets enter the stationary input channels 64 of the switching mechanism 62. The switch engaging members of pallets which have remained aligned with the article conveying path normal thereto nominally remain properly aligned to enter the appropriate input channels 64. However, in the event that one or more of the pallets has become misaligned by any means, camming members 150 are provided for properly aligning the switch engaging members to enter the input channels 64.

Referring to FIG. 12, there is shown a portion of a control apparatus which is utilized in the sorting switch 20 to regulate the pivotal movement of the switching channels 66 of the switching apparatus 62 to cause the pallets comprising a particular set to either remain aligned with the article conveying path normal thereto or to divert the pallets of the set into alignment with the opposite article conveying path. A lamp 152 and a series of lenses 154 direct a beam of light to a photoresponsive apparatus 156. The path of the beam of light from the lamp 152 to the photoresponsive apparatus 156 extends transversely across the upper article sorting portion 126 of the course of the pallet support member 24. The path of light is therefore broken if an article is positioned in the upper article sorting portion 26 of the course of the pallet support members 24 between the lamp 152 and the photoresponsive apparatus 156.

The path of light from the lamp 152 to the photoresponsive apparatus 156 also extends through a pallet positioning indicating wheel 158. The wheel 158 is provided with a plurality of slots 160 each indicative of the positioning of the switch engaging member of the first pallet comprising a predetermined set of pallets to permit switching of the appropriate switching apparatus 62 from one of its two conditions to the other. By this means switching is accomplished between articles, rather than under them. The wheel 158 is supported on a shaft 162 which is rotated in accordance with the movement of the pallets 32 under the action of the drive motor 114. It will be understood that in those instances in which the sorting switch comprises a different number of pallets, the wheel 158 will include a different number of slots 160 that is either equal to or is equal to a multiple of the number of sets of pallets, depending upon the ratio of the speed of rotation of the wheel 158 to the speed of pallet movement.

Figure 13:
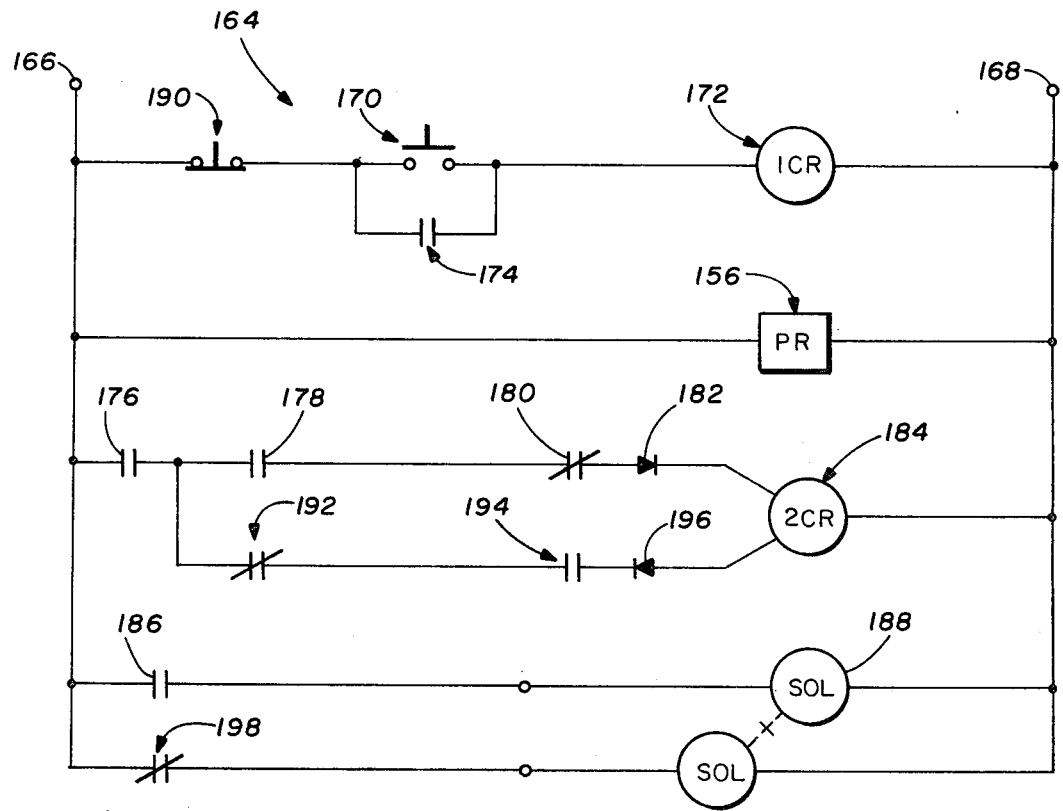
FIG. 13 is a schematic illustration of an electrical control circuit utilized in the sorting switch.

Referring to FIG. 13, the apparatus of FIG. 12 is utilized in conjunction with an electrical control circuit 164. Conventional 115 volt, 60 hz line current is received through a pair of terminals 166 and 168. Each switching apparatus 62 of the sorting switch 20 is normally conditioned to direct the sets of pallets along the article conveying path normal thereto. Whenever it is desired to divert a set of pallets into alignment with the opposite article conveying path, a switch 170 is closed, whereupon a first control relay 172 is operated, and locks are operated through a normally opened contact pair 174.

The photoresponsive apparatus 156 of FIG. 12 is also actuated through the terminals 166 and 168. Whenever the apparatus 156 receives light, a normally open contact pair 176 is closed. Current is therefore directed through a normally open, now closed contact pair 178 of the relay 172, a normally closed pair of latching contacts 180, and a diode 182 to operate a second control relay 184 closes a normally open contact pair 186 to direct operating power to a solenoid 188. The solenoid 188 then operates to pivot the switching channel 66 of the associated switching apparatus 62 from the position which causes the set of pallets to remain aligned with the article conveying path normal thereto to the position wherein the set of pallets is diverted into alignment with the opposite article conveying path.

Assume now that it is desired to return the switching apparatus 62 to the configuration in which a particular set of pallets is allowed to remain aligned with the article conveying path normal thereto. A normally closed switch 190 is opened. This causes the first control relay 172 to drop out, thereby closing a normally open contact pair 192. Assuming that the light responsive apparatus 156 is receiving light, the second control relay 184 is allowed to de-energize through the contact pair 192, a normally open, now closed latching contact pair 194, and a diode 196. This closes a normally closed contact pair 198, whereby the solenoid 188 is actuated to return the switching apparatus 62 to its original condition.

In FIG. 13, the switches 170 and 190 are indicated as manually actuated switches. While the use of manually actuated switches is a feasible method of operating the sorting switch 20, those skilled in the art will realize that the switches 170 and 190 are readily adapted for automatic acutation. For example, various apparatus may be utilized to actuate the switches 170 and 190 in accordance with size, weight, color, shape, etc. of articles being conveyed. The articles may also be provided with indicia relating to the nature of the contents thereof, in which event suitable reading apparatus may be utilized to operate the switches 170 and 190. Finally, the operation of the switches 170 and 190 may be computer controlled, if desired.

The relationship between the electrical control circuit of FIG. 13 and the switching apparatus 62 of the sorting switch 20 is illustrated in FIG. 14. The solenoid 188 is a double-acting solenoid having a core 200. The core 200 of the solenoid 188 is connected to a four-way valve 202, whereby actuation of the solenoid 188 results directly in the positioning of the valve 202 in one or the other of its two positions. The valve 202 controls the flow of a pressurized fluid from a source 204 thereof, to the opposite ends of a cylinder 206, to an exhaust port or sump 207. A piston 208 is slidably supported in the cylinder 206 and has a piston rod comprising the rod 92 which is connected to the diverter plate 70 of the switching apparatus 62. It will thus be understood that the operational state of the solenoid 188 and the pivotal positioning of the diverter plate 70 and the diverter bars 68 mounted thereon of the switching apparatus 62 are directly related.

The various operating modes of the sorting switch 20 are illustrated in FIGS. 15–18, inclusive. Articles traveling along the input paths represented by the arrows 44L and 44R are received by a pair of accumulator conveyors 210L and 210R. A pair of metering conveyors 212L and 212R are utilized to transport individual articles from the accumulator conveyors 210L and 210R to the sorting switch 20. By means of the metering conveyors 212L and 212R, individual articles are transported from the accumulator conveyors 210L and 210R at such time as a set of pallets of the sorting switch 20 is in a position to receive the article. Articles passing through the sorting switch 20 are received by a pair of output conveyors 214L and 214R as represented by the arrows 46L and 46R. The accumulator conveyors 210L and 210R, the metering conveyors 212L and 212R, and the output conveyors 214L and 214R may be of any of the commercially available types.

Figure 15:
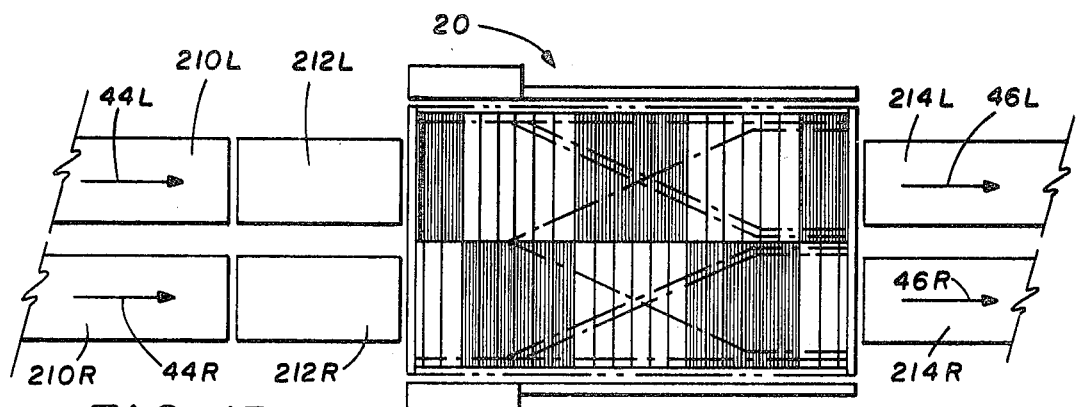
FIGS. 15–18 inclusive are diagrammatic illustrations of various operating modes of the sorting switch.

In FIG. 15, the sorting switch 20 is shown operating in the straight through mode. That is, each article received by the sorting switch 20 from the accumulator conveyor 210L under the action of the metering conveyor 212L is directed to the output conveyor 214L by one of the sets of pallets of a sorting switch 20. Likewise, each article received from the accumulator conveyor 210R under the action of the metering conveyor 212R is directed to the output conveyor 214R by one of the sets of pallets of the sorting switch 20.

Figure 16:
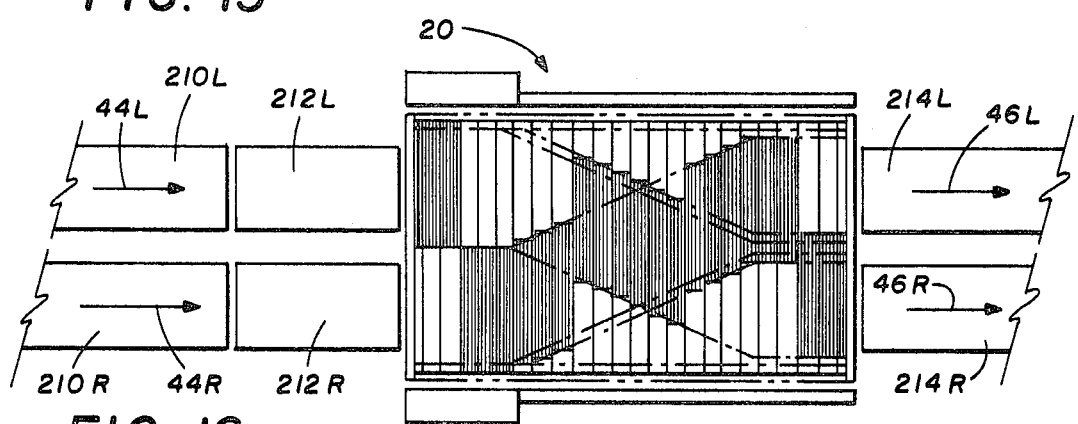

In FIG. 16, the sorting switch is shown operating in the crossover mode. In this mode, each article received by the sorting switch 20 from the accumulator conveyor 210L under the action of the metering conveyor 212L is delivered to the output conveyor 214R by one of the sets of pallets comprising the sorting switch 20. Likewise, each article received from the accumulator conveyor 210R under the action of the metering conveyor 212R is directed to the output conveyor 214L. Those skilled in the art will appreciate the fact that by means of appropriate control circuitry, the sorting switch can be selectively operated either in the straight through mode illustrated in FIG. 15 or in the crossover mode illustrated in FIG. 16, thereby performing an article sorting function.

Figure 17:
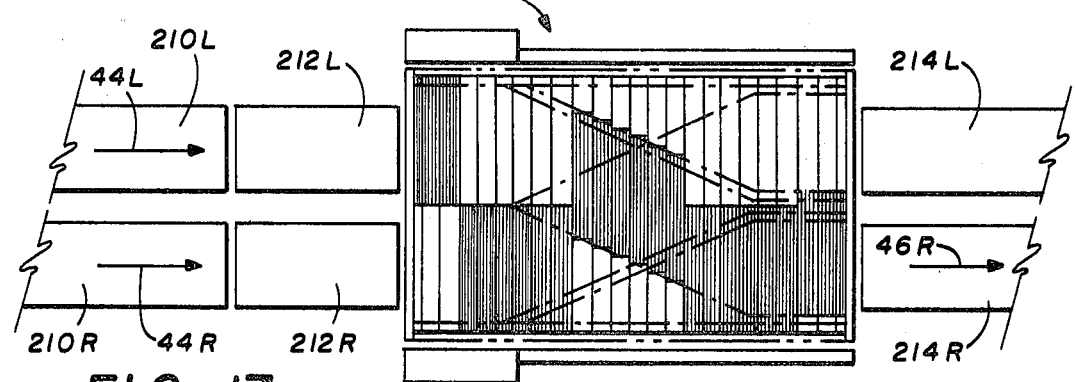

In FIG. 17, the sorting switch 20 is shown operating in a combining mode. That is, articles received both from the accumulator conveyor 210L and from the accumulator conveyor 210R under the action of the metering conveyors 212L and 212R are directed to a single output conveyor, in this case the output conveyor 214R. Obviously, all of the articles received from the two input paths can be directed to the output conveyor 214L with equal facility. Moreover, the combining function can be performed selectively, whereby only certain received articles are combined and the remainder ar allowed to follow the article conveying path normal thereto.

Figure 18:
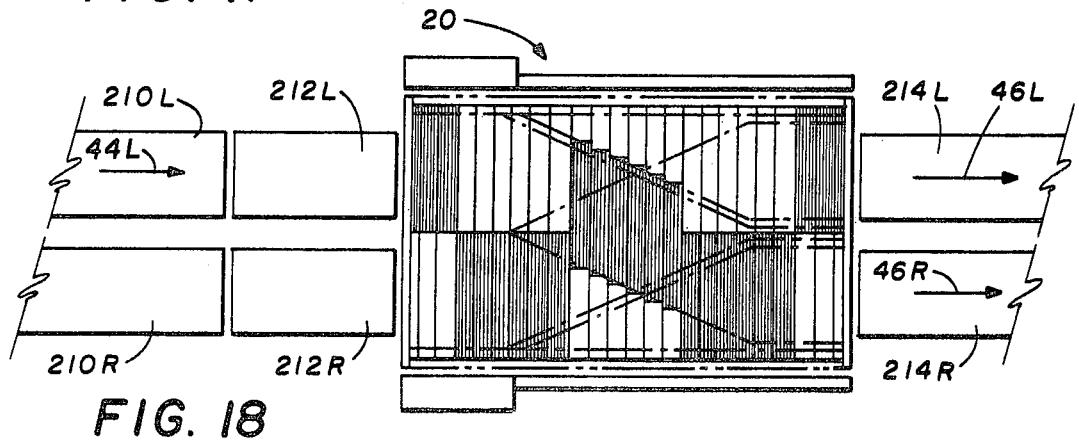

In FIG. 18, the sorting switch 20 is shown operating in a diverging mode. That is, articles received from a single input path, in this case the path including the accumulator conveyor 210L and the metering conveyor 212L, are selectively directed to either of the two output conveyors 214L or 214R. the criteria for selective diversion of the articles may be based on color, size, weight, etc. The sorting switch 20 may also be operated to divert articles on the basis of the positioning of a particular article in the sequence of articles. For example, every other article can be diverted, etc.

From the foregoing, it will be understood that the present invention comprises a novel sorting switch incorporating numerous advantages over the prior art. One of the primary advantages deriving from the use of the invention involves the fact that by means thereof, it is possible to receive articles from two input paths and to selectively direct each article to either of two output paths. Another advantage in the use of the invention involves the fact that by means of the channel-shaped pallet support members utilized therein, it is possible to accommodate substantial greater loads in a sorting switch than has been possible heretofore. Still another advantage deriving from the use of the invention involves the fact that the sorting switch utilizes an improved switching mechanism which is characterized by the ability to effect switching of pallets with considerably less likelihood of damage thereto than has been the case in conjunction with prior switching mechanisms. Other advantages deriving from the use of the invention will readily suggest themselves to those skilled in the art.

Although preferred embodiments of the invention have been described in the foregoing Detailed Description and illustrated in the accompanying Drawings, it will be understood that the invention is not limited to the embodiments disclosed, but is capable of numerous rearrangements, modifications, and substitutions of parts and elements without departing from the spirit of the invention.

What is claimed is:
1. A sorting switch comprising:
  a plurality of channel-shaped pallet support members each comprising a relatively wide, substantially flat upper web and flanges depending from each edge of the web;
  means for moving the channel-shaped support members sequentially around a predetermined closed course;
  a plurality of pallets each slidably supported on one of the channel-shaped pallet support members for transverse movement relative to the course between at least two predetermined positions with respect thereto;
  each of the pallets comprising a relatively wide, substantially flat upper web, a pair of flanges each depending from each edge of the web, and a pair of flanges each extending inwardly from the lower edge of one of the flanges;
  each of the pallets having a switch engaging member depending therefrom;
  stationary input channel means for receiving the switch engaging member of each pallet as the pallets are moved around the course on the channel-shaped pallet support members under the action of the moving means;
  switching channel means for receiving each switch engaging member from the input channel means;
  means for selectively pivoting the switching channel means between at least two pivotal positions and thereby selectively directing each switch engaging member and the pallet connected thereto along one or the other of two predetermined paths; and
  camming structure for receiving the switch engaging members from the switching channel means and defining the two predetermined paths.

2. The sorting switch according to claim 1 wherein the moving means further includes a pair of spaced, parallel drive chains defining the predetermined closed course and positioned at the opposite end of the channel-shaped pallet support members, and means connecting each end of the pallet support member to the adjacent drive chain.

3. The sorting switch according to claim 2 wherein the means connecting each end of each pallet support member to the adjacent drive chain is further characterized by:
  a block secured to each end of each channel-shaped pallet support member;
  each block having a pair of spaced apart, aligned apertures formed therethrough; and
  a pin extending through each aperture in each block and through the adjacent drive chain to connect the channel-shaped pallet support member to the drive chain.

4. The sorting switch according to claim 1 further including means for regulating the operation of the switching channel means pivoting means to change the pivotal positioning of the switching channel means in accordance with the positioning of the switch engaging members of the pallets relative to the course.

5. The sorting switch according to claim 1 wherein the switching channel means includes a pair of identical, pivotally supported diverter bars for receiving the switch engaging members of the pallets, and a pair of identical, fixedly mounted diverter bars which are also identical to the pivotally supported diverter bars and which are positioned to receive the switch engaging members of the pallets therefrom, said fixedly mounted diverter bars comprising part of the camming structure.

6. The sorting switch according to claim 1 wherein the upper web, the flanges, and the lip of each of the pallets comprises a unitary body of plastic material.

7. The sorting switch according to claim 6 wherein the pallet is further characterized by a rectangular block received therein and secured to the lips of the pallet, and wherein the switch engaging member of the pallet depends from the rectangular block.

8. In a sorting switch of the type including a plurality of pallets each mounted both for movement around a closed course and for transverse movement relative to the course to effect article sorting, the improvement comprising:
  a plurality of channel-shaped pallet support members each having a relatively wide, substantially flat upper web and flanges depending from both edges of the web;
  each of the channel-shaped pallet support members individually supporting one of the pallets for movement around the course and for transverse movement relative to the course;
  means supporting the channel-shaped pallet support members for sequential movement around said closed course; and
  means for selectively positioning each pallet on its respective pallet support member in a direction extending transverse relative to the closed course and thereby effecting article sorting.

9. The improvement according to claim 8 wherein the course of movement of the channel-shaped pallet support members and the pallets supported thereby is defined by a pair of spaced apart drive chains, and wherein each end of each channel-shaped pallet support member is secured to one of the drive chains.

10. The improvement according to claim 9 wherein each of the channel-shaped members has a pair of blocks secured in the opposite ends thereof, and further including means securing the blocks at the ends of each channel-shaped pallet support member to the adjacent drive chains.

11. The improvement according to claim 10 wherein the drive chains comprise hollow pin roller chains, wherein the block at each end of each channel-shaped pallet support member has a pair of longitudinally extending apertures formed therein, and further including a pair of pins extending through the apertures of the blocks of the channel-shaped pallet support members and through the pins of the adjacent drive chains to secure the channel-shaped pallet support members to the drive chains.

12. The improvement according to claim 8 wherein each of the channel-shaped pallet support members supports a pallet comprising:
   a relatively wide, substantially flat upper web;
   a pair of flanges each depending from one edge of the web; and
   a pair of lips each extending inwardly from the lower edge of one of the flanges substantially parallel to the upper web;
   said upper web, flanges and lips comprising a unitary body of plastic material.

13. A sorting switch comprising:
   a plurality of channel-shaped pallet support members each comprising a relatively wide, substantially flat upper web and flanges depending from each edge of the web;
   means defining a predetermined closed course of movement for said channel-shaped pallet support members;
   means for moving the channel-shaped pallet support members sequentially around said predetermined closed course;
   a plurality of pallets each slidably supported on one of the channel-shaped pallet support members for transverse movement relative to the course between at least two predetermined positions with respect thereto; and
   switching means for selectively positioning the pallets relative to the channel-shaped pallet support members and transversely relative to the course, and thereby effecting article sorting.

14. The sorting switch according to claim 13 further characterized by:
   a pair of spaced, parallel drive chains defining the predetermined closed course and positioned at the opposite ends of the channel-shaped pallet support members; and
   means connecting each end of each channel-shaped pallet support member to the adjacent drive chain.

15. The sorting switch according to claim 14 wherein the drive chains comprise hollow pin roller chains, and wherein the connections between the channel-shaped pallet support members and the drive chains are further characterized by:
   a block secured to each end of each channel-shaped pallet support member, each of said blocks having a pair of spaced apart, parallel apertures formed therethrough; and
   a plurality of pins each extending through one of the apertures in one of the blocks on one end of a channel-shaped pallet support member and through one of the hollow pins of the adjacent drive chains to connect the channel-shaped support members to the drive chains.

16. The sorting switch according to claim 13 wherein the switching means is further characterized by:
   a switch engaging member depending from each of the pallets; and
   switching apparatus mounted for engagement with the switch engaging members of the pallets to selectively shift the positioning of each pallet on its channel-shaped pallet support member and transversely relative to the predetermined course.

17. The sorting switch according to claim 16 wherein the switching apparatus further comprises:
   stationary input channel means for receiving the switch engaging member of each pallet;
   switching channel means for receiving the switch engaging member of each pallet from the input channel means;
   means for selectively pivoting the switching channel means and thereby directing the switch engaging members and the pallets connected thereto along either of two predetermined paths; and
   camming structure for receiving the switch engaging members from the switching channel means and defining the two predetermined paths.

18. The sorting switch according to claim 13 wherein each of the pallets comprises a relatively wide, substantially flat upper web extending over the upper web of the associated channel-shaped pallet support member, a pair of flanges depending from each edge of the web and extending adjacent to the flanges of the associated pallet support member, and a pair of lips extending inwardly from the lower ends of the flanges under the lower ends of the flanges of the associated pallet support member, said web, flanges and lips comprising a unitary body of plastic material.

19. In a sorting switch of the type comprising a plurality of pallets mounted for movement in sequence around a predetermined closed course and each having a switch engaging member depending therefrom for actuation to move the pallets transversely relative to the course and thereby effect article switching, an improved pallet switching apparatus comprising:
   input channel means for receiving the switch engaging member of each pallet during the movement thereof around the closed course;
   the input channel means defining a predetermined input path of the switch engaging members;
   switching channel means for receiving the switch engaging member of each pallet from the input channel means;
   means supporting the switching channel means for pivotal movement around a predetermined axis;
   means for selectively positioning the switching channel means in either of at least two pivotal positions and thereby directing switch engaging members received from the input channel means along one of at least two predetermined output paths; and
   camming structure for receiving the switch engaging members from the switching channel means and defining the two predetermined output paths.

20. The switching apparatus according to claim 19 wherein the switching channel means comprises a pair of identical diverter bars secured to a diverter plate and positioned to define a switch engaging member receiving channel therebetween.

21. The switching apparatus according to claim 26 wherein the supporting means supports the diverter plate for pivotal movement about the predetermined axis, and wherein the ends of the diverter bars adjacent to the input channel means are aligned with the axis of pivotal movement of the diverter plate so that the switch engaging member receiving channel is positioned to receive the switch engaging members from the input channel means regardless of its pivotal positioning.

22. The switching apparatus according to claim 21 further characterized by a pair of fixedly mounted diverter bars identical to each other and identical to the pivotally mounted diverter bars for receiving the switch engaging members from the switching channel means and comprising part of the camming structure.

23. The switching apparatus according to claim 22 wherein one of the fixedly mounted diverter bars is positioned to direct the switch engaging members along an output path which is parallel to the input path as defined by the input channel means, and wherein the other fixedly mounted diverter bar is positioned to direct the switch engaging members along an output path which extends angularly relative to the input path as defined by the input channel means.

24. The switching apparatus according to claim 22 wherein the fixedly mounted diverter bars are positioned to direct the switch engaging members along two output paths both extending angularly with respect to the input path as defined by the input channel means.

25. The switching apparatus according to claim 22 further characterized by an additional pair of fixedly mounted, identical diverter bars positioned for cooperation with the first two fixedly mounted diverter bars to define three output paths, one extending parallel to the input path as defined by the input channel means and the other two extending angularly with respect to the input path as defined by the input channel means.

26. The switching apparatus according to claim 22 wherein each of the diverter bars comprises a length of rectangular bar stock having ends cut at predetermined angles.

27. In a sorting switch of the type adapted for use with pallets having switch engaging members, a switching apparatus comprising:
a base plate;
a diverter plate;
means for slidably supporting the diverter plate on the base plate;
means for securing the diverter plate to the base plate and for defining an axis of pivotal movement of the diverter plate;
means for selectively positioning the diverter plate in either of at least two pivotal positions relative to the base plate;
a pair of diverter bars mounted on the diverter plate and positioned to define a switch engaging member receiving channel therebetween;
fastener means for detachably securing the diverter bars to the diverter plate;
camming structure for receiving switch engaging members from the channel defined by the diverter bars on the diverter plate and for directing the switch engaging members along one of at least two predetermined paths depending on the pivotal positioning of the diverter plate.

28. The switching apparatus according to claim 27 further including stationary input channel means for directing switch engaging members to the switch engaging member receiving channel defined by the diverter bars on the diverter plate.

29. The switching apparatus according to claim 28 wherein the end of the switch engaging member receiving channel defined by the diverter bars on the diverter plate adjacent to the input channel means is coincident with the axis of pivotal movement of the diverter plate, so that the switch engaging member receiving channel is adapted to receive switch engaging members regardless of the pivotal positioning of the diverter plate.

30. The switching apparatus according to claim 29 wherein the camming structure is further characterized by at least two fixedly mounted diverter bars positioned to receive switch engaging members from the switch engaging member receiving channel defined by the diverter bars mounted on the diverter plate, the fixedly mounted diverter bars being identical to each other and identical to the diverter bars mounted on the diverter plate.

31. The switching apparatus according to claim 30 wherein the input channel means defines an input path of switch engaging member movement, wherein one of the fixedly mounted diverter bars is positioned to direct switch engaging members along a path which is parallel to the input path of switch engaging member movement, and wherein the other fixedly mounted diverter bar is positioned to direct switch engaging members along an angularly extending path.

32. The switching apparatus according to claim 30 wherein the input channel means defines an input path of switch engaging member movement, and wherein both of the fixedly mounted diverter bars are positioned to direct the switch engaging members along paths which extend angularly with respect to the input path of switch engaging member movement.

33. The switching apparatus according to claim 30 further including two additional fixedly mounted diverter bars both identical to the remaining diverter bars and positioned for cooperation with the first two fixedly mounted diverter bars to define three paths of switch engaging member travel, one extending parallel to an input path of switch engaging member travel as defined by the input channel means and the other two extending angularly with respect thereto.

34. The switching apparatus according to claim 30 wherein each of the diverter bars comprises a length of rectangular bar stock having ends extending at predetermined angles.

35. The switching apparatus according to claim 34 wherein each diverter bar has one perpendicular end and one end extending at approximately 12 1/2°.

36. For use in a sorting switch, a pallet comprising:
a relatively wide, substantially flat upper web;
a pair of flanges each depending from one edge of the web and extending along substantially the entire length thereof;
a pair of lips each extending inwardly from the lower edge of one of the flanges substantially parallel to the upper web;
said upper web, flanges and lips comprising a unitary body of plastic material;
said web, flanges and lips defining therewithin a pallet support member receiving zone;
means positioned within said pallet support member receiving zone and secured to the pallet for securing the pallet in engagement with a pallet support member extending through the pallet receiving zone; and
a switch engaging member depending from the securing means.

37. The pallet according to claim 36 wherein the pallet comprises a plastic extrusion.

38. The pallet according to claim 36 wherein the pallet is formed from high molecular weight polyethylene.

39. The pallet according to claim 36 further including a pallet support member received in the pallet and slidably supporting the pallet, the pallet support member comprising a relatively wide, substantially flat upper web and a pair of flanges each depending from one edge of the web.

40. The pallet according to claim 39 wherein the pallet support member has an exterior surface which is shaped substantially identically to the mating interior surface of the pallet.

41. The pallet according to claim 40 wherein the securing means comprises a rectangular block received in the pallet and secured to the lips thereof.

42. The pallet according to claim 36 further including a pair of tubular pallet support members received in the pallet and slidably supporting the pallet, each of said tubular pallet support members being received between the upper web and one of the lips of the pallet and extending adjacent to one of the flanges thereof.

43. The pallet according to claim 42 wherein the securing means comprises a rectangular block received in the pallet between the tubular pallet support members.

44. A sorting switch including:
a plurality of channel-shaped pallet support members each comprising a relatively wide, substantially flat upper web and a pair of flanges depending from the opposite edges of the upper web; and
a plurality of pallets each slidably supported on one of the channel-shaped pallet support members and each comprising a relatively wide, substantially flat upper web, a pair of flanges depending from the opposite edges of the upper web, and a pair of lips extending inwardly from the lower edges of the flanges and substantially parallel to the upper web.

45. The sorting switch according to claim 44 wherein the upper web, the flanges, and the lips of each pallet comprise a unitary body of plastic material.

46. The sorting switch according to claim 44 wherein the pallets are formed from high molecular weight polyethylene.

47. The sorting switch according to claim 44 further including;
a rectangular block received in each pallet between the upper web and the lips thereof;
means securing the block to the lips of the pallet; and
a switch engaging member depending from the rectangular block.

48. A sorting switch including:
a plurality of tubular pallet support members;
a plurality of pallets each slidably supported on an adjacent pair of tubular pallet support members and each comprising a relatively wide, substantially flat upper web, a pair of flanges depending from the opposite edges of the upper web, and a pair of lips extending inwardly from the lower edges of the flanges and parallel to the upper web;
the tubular pallet support members each being positioned between the upper web and one of the lips of the pallets and adjacent to one of the flanges;
a rectangular block received in each pallet between the upper web and the lips thereof and between the tubular pallet support members; and
a switch engaging member depending from the rectangular block.

49. The sorting switch according to claim 48 wherein each of the pallets comprises a unitary body of plastic material.

* * * * *